Aug. 10, 1926.  
E. INGHAM  
1,595,403  
MEANS FOR PRODUCING DIAGONALLY WOVEN CIRCULAR FABRICS  
Original Filed July 24, 1919    7 Sheets-Sheet 4
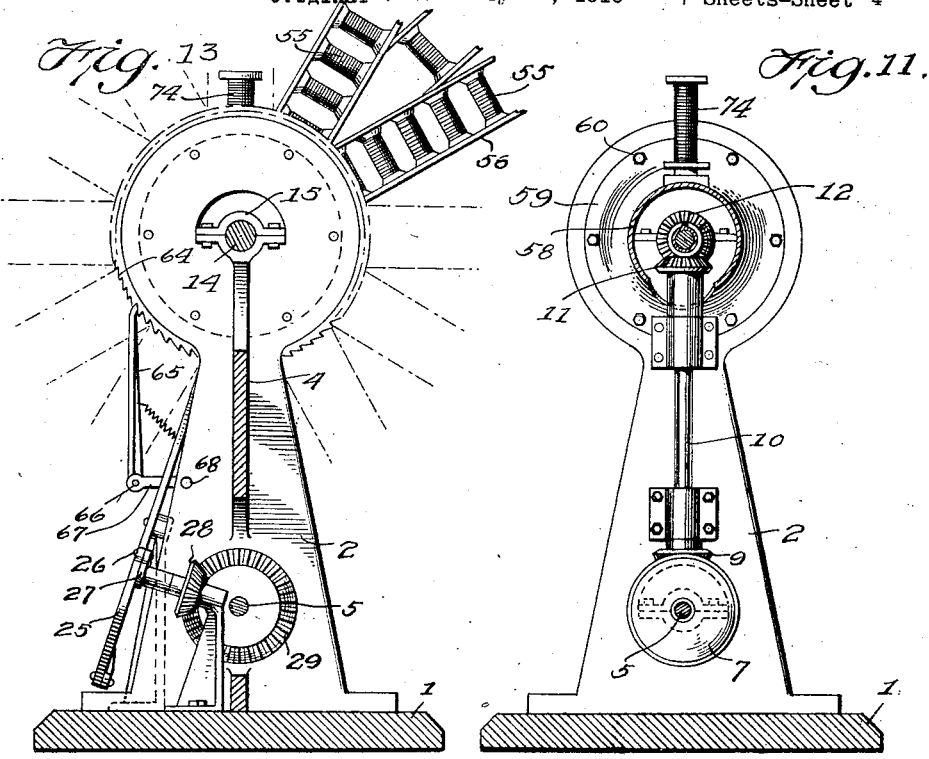
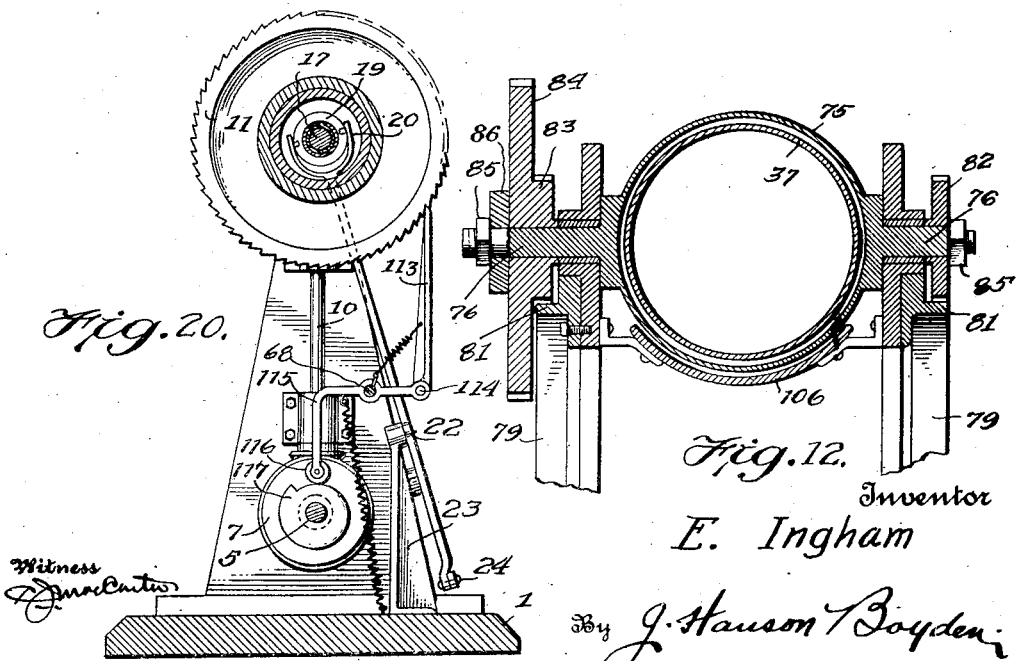

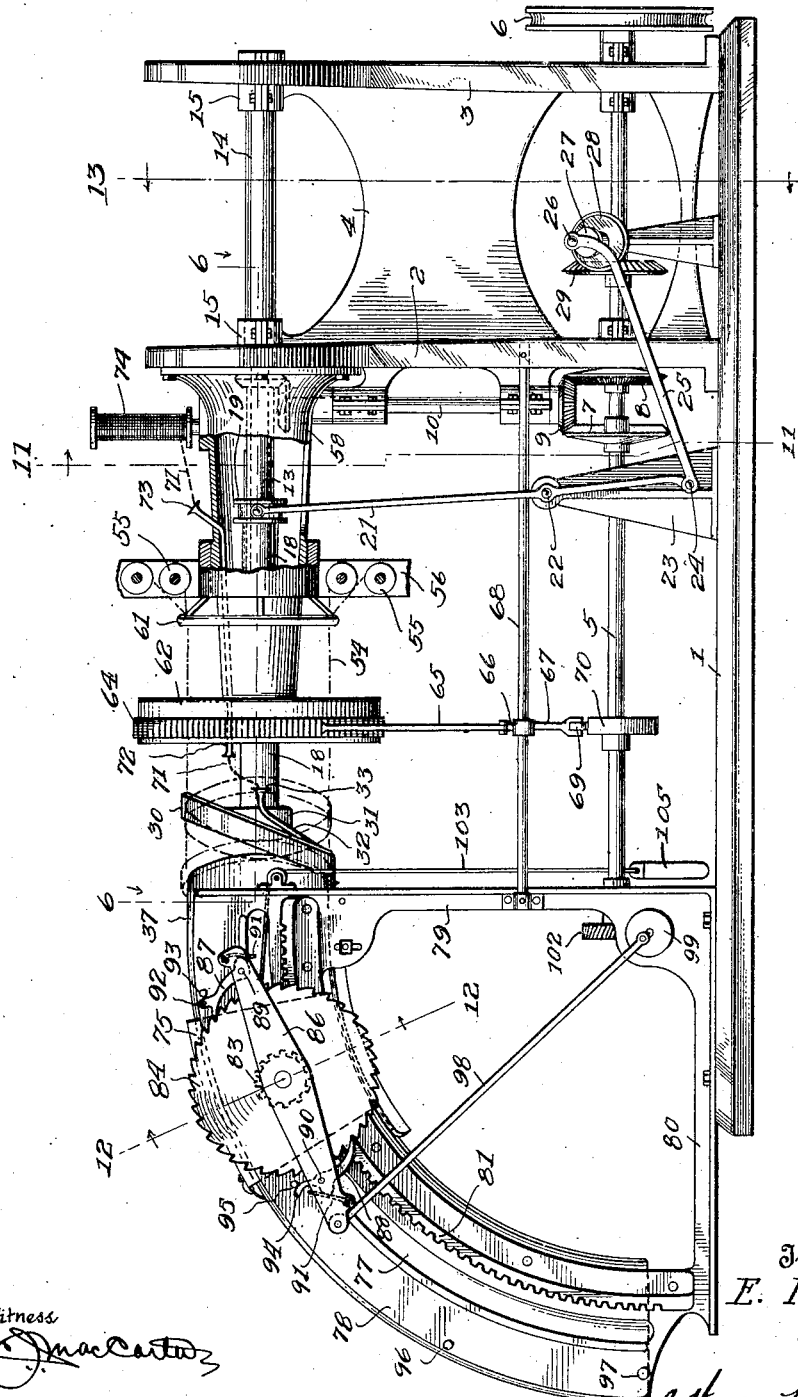

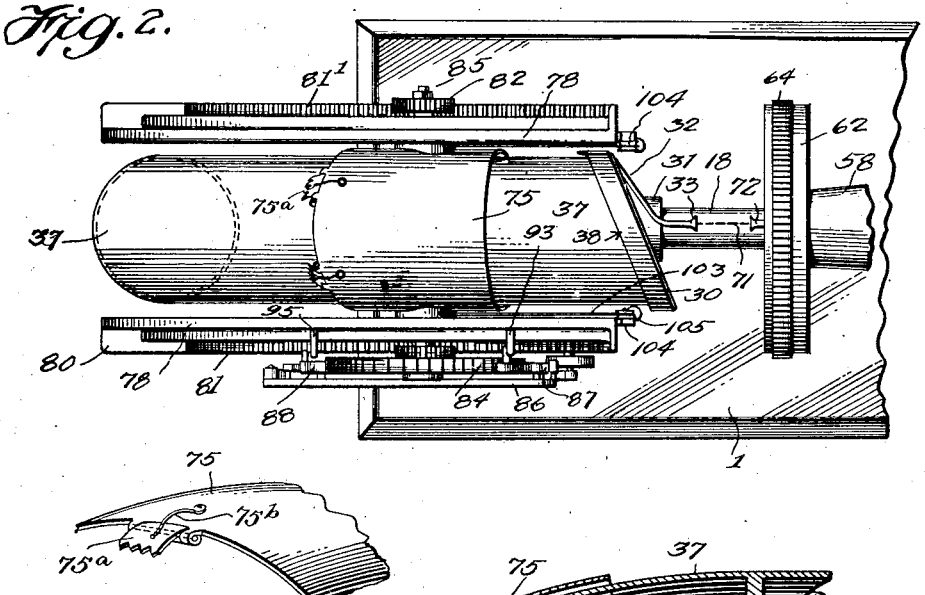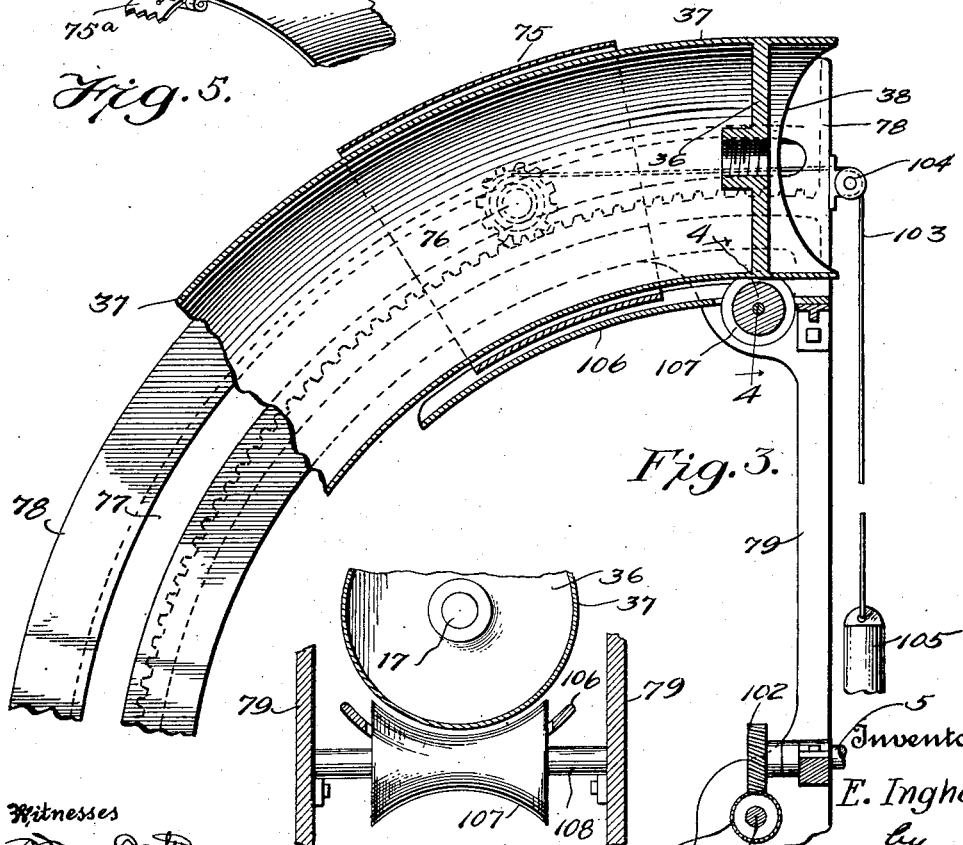

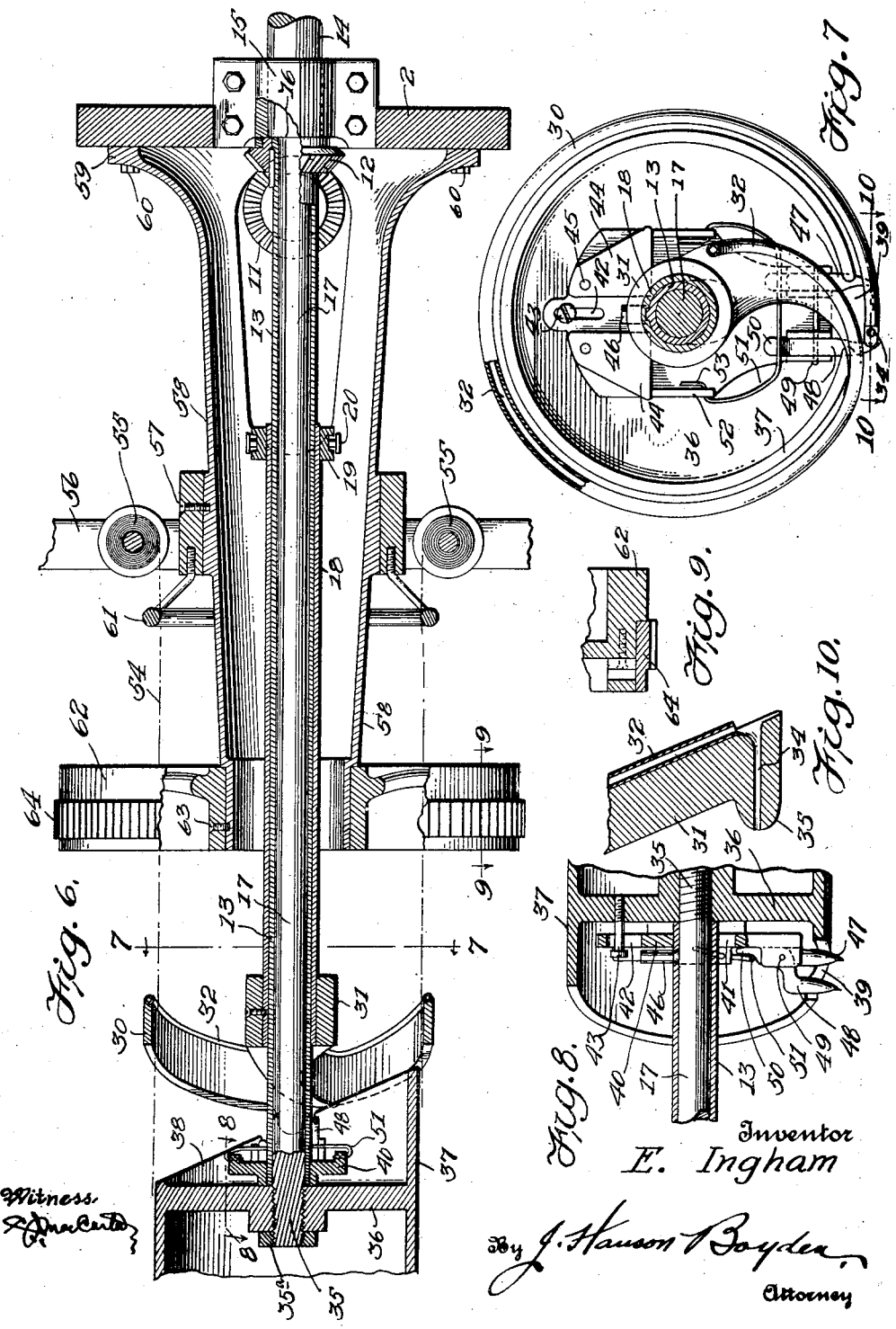

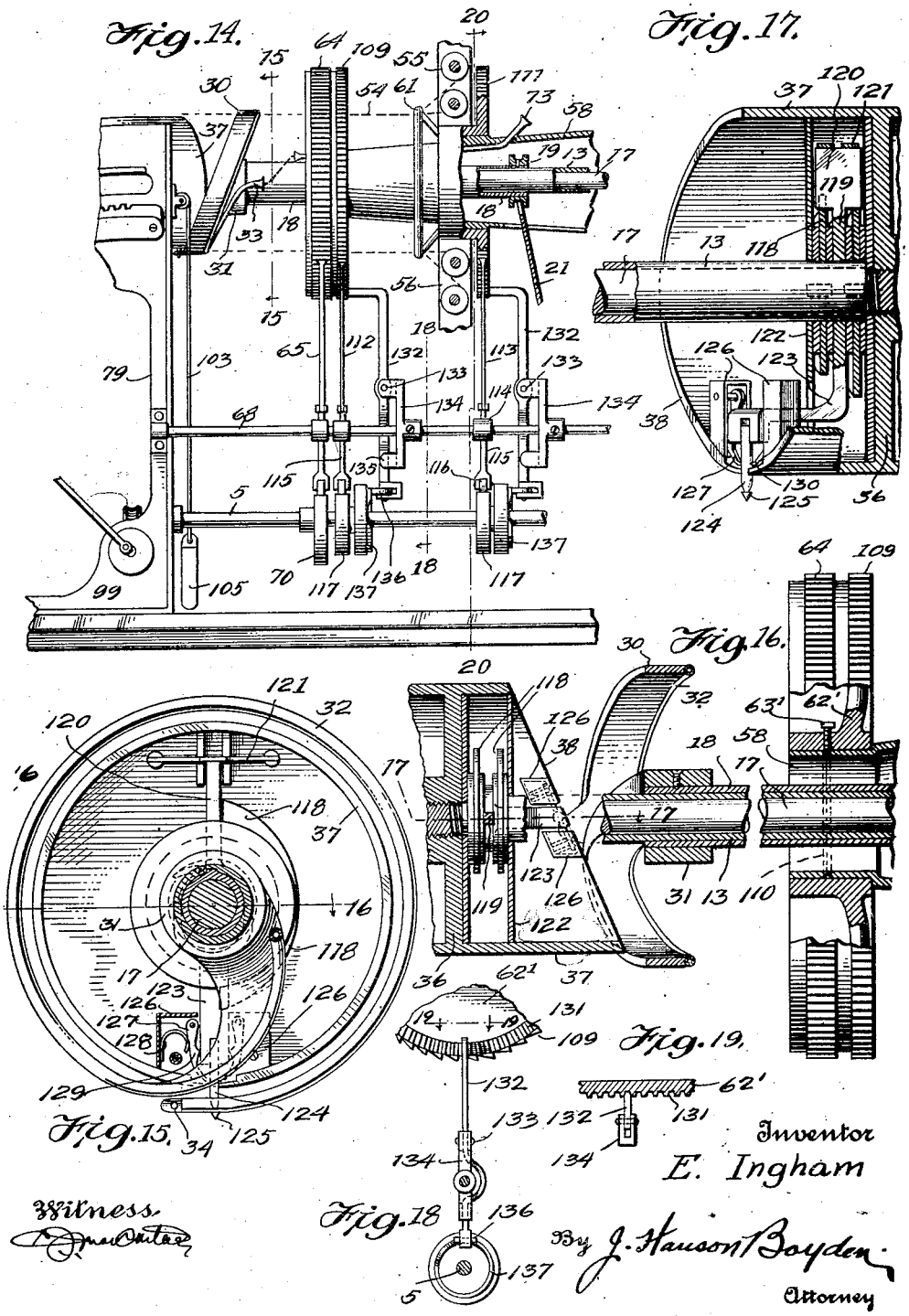

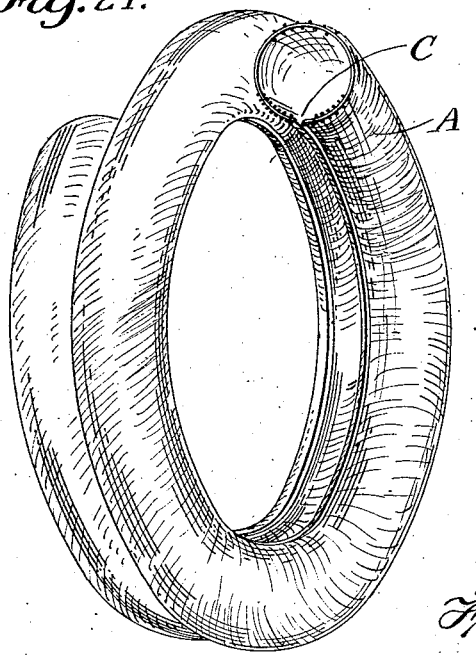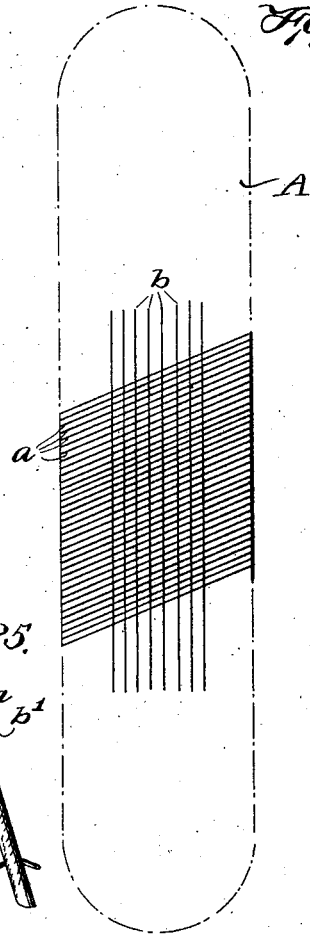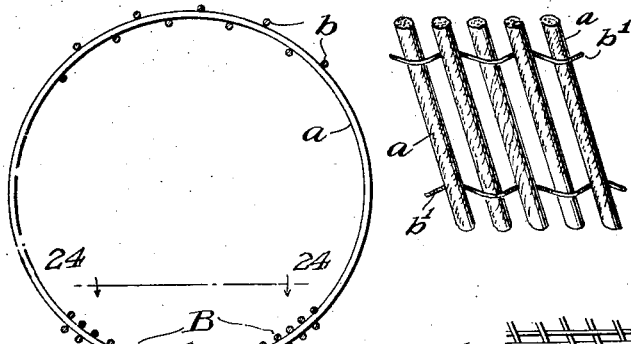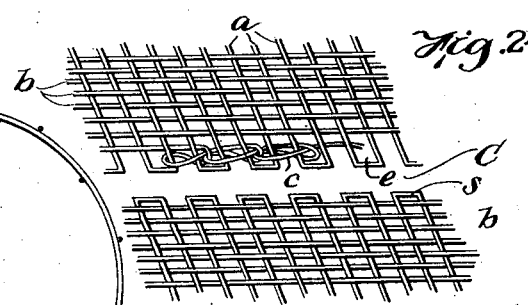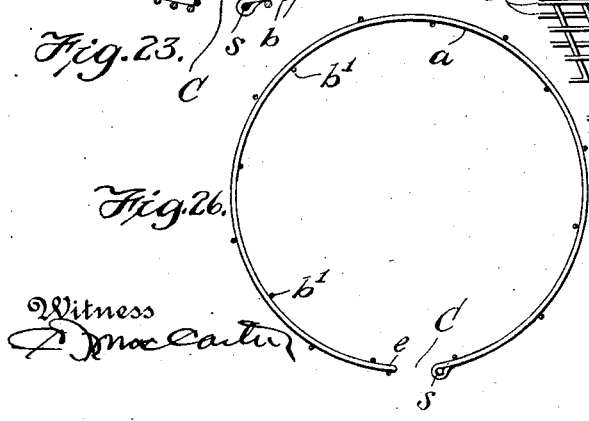

Aug. 10, 1926.

E. INGHAM 1,595,403

MEANS FOR PRODUCING DIAGONALLY WOVEN CIRCULAR FABRICS

Original Filed July 24, 1919   7 Sheets-Sheet 7

Witness

Inventor
E. Ingham
By J. Hanson Boyden
Attorney

Patented Aug. 10, 1926.

1,595,403

UNITED STATES PATENT OFFICE.

EMANUEL INGHAM, OF WASHINGTON, DISTRICT OF COLUMBIA.

MEANS FOR PRODUCING DIAGONALLY-WOVEN CIRCULAR FABRICS.

Application filed July 24, 1919, Serial No. 313,056. Renewed October 18, 1923.

This invention relates to a method of and means for weaving tubular or circular fabrics, and especially fabrics of this character particularly suited for use in the manufacture of pneumatic tires.

The present invention is in the nature of further developments and improvements on the circular fabric weaving machines disclosed in my prior Patents No. 1,328,794, dated January 20, 1920, (reissued Feb. 6, 1923, as No. 15,536); No. 1,403,785, dated January 17, 1922; and No. 1,438,916, dated December 12, 1922.

While in my former patents, above identified, I have shown means for producing a woven tubular fabric in which the warp threads run longitudinally and the weft threads transversely, at right angles to the warp and to the axis of the fabric, by the present invention I seek to provide means for producing a circular woven fabric in which either the warp or the weft, or both, extend diagonally across or around the fabric, at an acute angle to the axis thereof. This results in a woven circular fabric in which all of the advantages of the tire casings, heretofore built up of flat bias strips of canvas or of plane sheets of cord fabric are present, and all of the great difficulties encountered in the manufacture of such casings are obviated.

The primary object is, therefore, to produce a woven circular fabric, either U-shaped in cross section or a complete tube, comprising warp and weft threads, at least one of which is laid diagonally or on the bias, which fabric conforms substantially to the shape of a tire as it leaves the loom, whereby all pressing, forming and molding of the fabric is eliminated.

A further object of the invention is to provide simple and efficient take-up mechanism for automatically receiving and feeding the tubular material as it comes from the weaving devices, such take-up mechanism having one end free, whereby the fabric can pass off of the same continuously even though it be a complete tube. A still further object is to provide improved mechanism for actuating the detents around which the oscillating needle lays the weft thread to form loops, as disclosed broadly in the first of my above mentioned applications.

With the above and other objects in view, as will hereinafter appear, my invention consists in the construction and arrangement of parts hereinafter described and claimed and illustrated in the accompanying drawings, in which:

Figure 1 is a side elevation of one form of my complete machine arranged for producing U-shaped fabrics in which the warp threads extend longitudinally and the weft threads diagonally.

Figure 2 is a plan view of the parts shown in the left hand end of Figure 1.

Figure 3 is a vertical longitudinal section on an enlarged scale through the center of the take-up mechanism as shown in Figure 2, parts being broken away.

Figure 4 is a fragmentary transverse section on the line 4—4 of Figure 3.

Figure 5 is a fragmentary perspective view of a part of the fabric feeding or take-up mechanism shown in Figures 2 and 3.

Figure 6 is a central, horizontal, longitudinal section substantially on the line 6—6 of Figure 1.

Figure 7 is a transverse section on the line 7—7 of Figure 6 looking in the direction of the arrow.

Figure 8 is a fragmentary, longitudinal section substantially on the line 8—8 of Figure 6 looking downwardly.

Figure 9 is a fragmentary transverse section on the line 9—9 of Figure 6.

Figure 10 is a fragmentary horizontal section on an enlarged scale through the point of the needle, as indicated by the line 10—10 of Figure 7.

Figure 11 is a transverse vertical section through the complete machine substantially on the line 11—11 of Figure 1 looking toward the right.

Figure 12 is a transverse section on an enlarged scale on the line 12—12 of Figure 1.

Figure 13 is a vertical transverse section through the complete machine substantially on the line 13—13 of Figure 1 looking toward the left.

Figure 14 is a fragmentary side elevation of parts of the machine shown in Figure 1, but illustrating a construction arranged to produce a complete tubular fabric in which both the warp and weft threads are laid diagonally.

Figure 15 is a transverse section on an enlarged scale on the line 15—15 of Figure 14 looking in the direction of the arrow.

Figure 16 is a fragmentary horizontal section substantially on the line 16—16 of Figure 15

Figure 17 is a vertical section substantially on the line 17—17 of Figure 16.

Figure 18 is a fragmentary section on the line 18—18 of Figure 14, looking toward the left.

Figure 19 is a fragmentary horizontal section on the line 19—19 of Figure 18, parts being omitted.

Figure 20 is a section on the line 20—20 of Figure 14, looking toward the right.

Figure 21 is a perspective view of a portion of tire fabric as woven on the machine shown in Figure 1.

Figure 22 is a diagrammatic view thereof illustrating the manner in which the warp and weft threads are laid.

Figure 23 is a conventional transverse section of the tire fabric showing one possible arrangement of warp threads.

Figure 24 is a horizontal section on the line 24—24 of Figure 23.

Figure 25 is a fragmentary perspective view showing the relation between the warp and weft threads.

Figure 26 is a view similar to Figure 23 showing another possible arrangement of warp threads.

Figure 27:
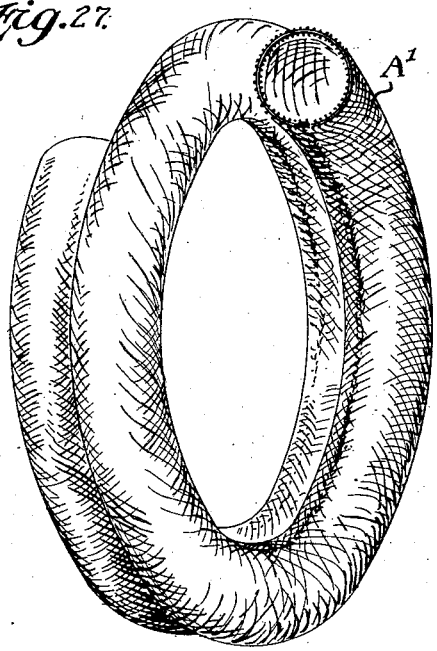
Figure 27 is a perspective view of a portion of tire fabric as woven on a machine modified as shown in Figures 14 to 20, inclusive.

Referring to the drawings in detail, my improved machine comprises a suitable base 1, having standards 2 and 3 united by a web 4, as in my prior constructions. The main shaft is designated at 5 and is journalled in bearings in the standards 2 and 3, and elsewhere as may be necessary. To the outer end of the shaft 5 is secured a belt wheel or pulley 6 by means of which driving power is applied to the machine. Mounted on the main shaft 5 is a pair of mutilated bevel gears 7 and 8 which mesh with a bevel pinion 9 carried at the lower end of a vertical shaft 10, to the upper end of which is secured a second bevel pinion 11. This meshes with a third bevel pinion 12 which is keyed to one end of a sleeve 13. This sleeve fits over and is rotatably supported on the reduced end 17 of a bar or shaft 14 which is stationary and fixed, being rigidly supported in clamps 15 carried by the standards 2 and 3. The rear end of the sleeve 13 abuts against a shoulder 16 formed on the bar 14.

Fitting over the sleeve 13 is a second and shorter sleeve 18 which is keyed to the sleeve 13 so as to turn therewith, but capable of sliding longitudinally thereon. To the rear end of this sleeve 18 is secured a curved ring 19 in which works pins or rollers carried by the bifurcated end 20 of a lever 21 pivoted at 22 to a suitable support 23. The lower end of the lever 21 is pivotally connected, as at 24, with a link 25, the other end of which is secured to a crank pin 26 carried by a crank disc 27 rigidly mounted on a stud shaft, to which is secured a beveled pinion 28, meshing with a bevel gear 29 fixed to the shaft 5.

To the forward end of the sleeve 18 is secured my improved needle, designated in its entirety by the reference numeral 30. As in my prior machines this needle is of curved or annular shape, and is supported from a central hub 31 by means of a single radial arm. A thread guide in the form of a tube 32 extends from a point near the center of the needle to its rear edge, and extends entirely around such edge, terminating at the delivery eye 34, as clearly shown in Figures 7 and 10. The rear or central end of the guide tube terminates in an enlarged or funnel shaped mouth 33 adapted to receive the weft thread.

The extreme forward end of the bar 14 or 17 extends beyond the sleeve 13, and is screw-threaded, as shown at 35 in Figure 6. To this screw-threaded end is rigidly secured, by means of a nut 35ª, one end of the curved form around which my improved circular fabric is woven. This form is designated in its entirety by the numeral 37 and is provided adjacent its end with a transverse wall 36 having an opening which fits over the screw-threaded nut 35. It will be observed by reference to the drawings that this form is circular in cross-section and curves longitudinally through a distance of approximately 90°. It will be seen that the lower end of this form is entirely free and that the whole form is supported from its upper end by means of the shaft or bar 14.

The rear or upper end of the form 37 is bevelled off at an angle as shown at 38, and at the lowermost point of this bevel edge is formed a notch 39 (see Figure 8) through which the movable detents, hereinafter described, project. A plate 40 is provided with an elongated slot 41 which fits over the sleeve 13, and also with the guide slot 42 which works over a pin or bolt 43 set into the partition wall 36 of the form. To the upper part of the plate 40 is pivoted at 45, a pair of swinging latches 44 arranged one at either side of the slot 42. A pin or lug 46 projecting radially from the sleeve 13 is adapted to engage or shift these latches in accordance with the direction of rotation of the sleeve. In other words, when the sleeve rotates in one direction, the lug 46 will engage under one of the latches 44 and will lift the plate 40, while continued rotation in the same direction will cause the lug 46 to engage the vertical edge of the other latch and swing it to one side idly. On the return movement of the lug, the latch which was formerly idly shifted is now engaged by the lug and caused to lift the plate 40. Thus, as the sleeve 13 oscillates, the plate 40 is lifted periodically. To the lower part of the plate 40 are pivoted at 49, two detents 48, the lower ends 47 of which project through the notch 39, as clearly shown in Figure 8. These detents are held in the position shown in the drawings by means of a spring 51 engaging tail pieces 50 on the detents, the spring 51 passing through openings in brackets 52, carried by the plate 40, and being provided with suitably bent ends 53 adapted to bear against such plate. By this construction the detents 48 are yieldingly held in position, but are permitted to have a slight rocking movement about their pivots.

The warp threads are designated at 54 and are shown as being wound upon reels 55 carried by a suitable frame 56. This frame preferably consists of supporting members radiating from a central hub, which hub is secured by means of screws 57 to a rigid, hollow, horizontally extending bracket 58 of more or less conical shape, the base 59 of which is secured to the standard 2, as by means of bolts 60.

The warp threads from the reels 55 are led through a suitable circular guide 61 and thence to a circular heddle mechanism designated in its entirety by the numeral 62. This heddle may be of any suitable construction, but is preferably of the type shown in detail in my prior Patent No. 1,438,916, above referred to. From the heddle mechanism the warp threads pass through or around the needle and thence around the form 37.

As above mentioned the heddle mechanism which I prefer to use is similar to that shown in my prior Patent No. 1,438,916, and comprises a circular frame supported on a central hub. This hub is mounted on the forward end of the hollow bracket 58, to which it is rigidly secured by means of a set screw 63.

The heddle mechanism comprises a heddle actuating ring 64 which is capable of rotation on the circular frame 62 and is provided with ratchet teeth adapted to be engaged by a pawl 65, pivotally connected at 66 to a bell crank lever 67 pivotally mounted on a rod 68, and carrying at its lower end a roller 69 which engages with a cam 70 secured to the main shaft 5. As this shaft 5 rotates, it will therefore be obvious that the pawl 65 is reciprocated to drive the ratchet ring 64 around and actuate the heddles (not shown) as fully disclosed in my above mentioned patent.

The weft thread 71 (see Figure 1) is supplied from a reel 74 mounted upon the bracket 58, and passes through a guide tube 72, carried by this bracket and preferably provided with a flaring mouth 73. From the forward end of the tube 72 the weft thread 71 passes into the flaring mouth 33 and the guide tube 32 carried by the needle 30.

Arranged to fit around the curved form 37, and spaced therefrom a distance slightly greater than the thickness of the fabric being woven is a short segmental sleeve 75 conforming to the curvature of the form 37. This sleeve is provided with trunnions 76 which extend through elongated arc shaped slots 77 formed in a pair of curved guide plates 78 arranged one at each side of the form 37. These guide plates are supported at their upper ends by standards 79, and at their lower ends by horizontally extending arms 80, the standard 79 and arm 80 at each side preferably forming a single casting.

Extending parallel with the slots 77 on the outside of the frames 78 are arc shaped racks 81. With one of these racks engages a pinion 82 freely journalled on the end of one of the trunnions 76 and secured in position by a nut 85. With the other rack 81 engages a pinion 83, formed integral with or rigidly secured to a ratchet wheel 84, the wheels 83 and 84 being freely mounted on one of the trunnions 76. Also pivotally mounted on the projecting end of this trunnion is a pawl carrier 86, being held in position on the trunnion by means of a nut 85.

At one end of the pawl carrier 86 is pivotally mounted at 89 a pawl 87, and at the other end of the pawl carrier is pivotally mounted at 90 a pawl 88. Both of these pawls are provided adjacent their pivot with a cam surface on which bears a leaf spring 91 so arranged that each pawl will be yieldingly held in either one of two positions to which it may be shifted. The pawl 87 is provided with a projection 92, and the pawl 88 with a projection 94, these projections being adapted to engage pins 93 and 95, respectively, to shift the pawls into operative position as shown in Figure 1. These projections 92 and 94 are also adapted to engage other pins 96 and 97, respectively, to shift the pawls out of engagement with the ratchet wheel. The pins 93 and 95 are carried by the frame 78 near the upper end thereof and the pins 96 and 97 are carried by such frame near the lower end thereof, the pins 93 and 96 being disposed at a greater radial distance from the center of curvature of the frame than are the pins 95 and 97, whereby the pins for operating one pawl will not interfere with the operation of the other pawl.

Pivoted to one end of the pawl carrier 86 is a link 98, which extends radially inward toward the center of curvature of the frame 78, and at such center is connected to a crank pin carried by a crank disc 99. This disc is mounted on a shaft 100 suitably journalled in the frame of the machine and carrying a worm gear 101, which meshes with another worm gear 102 mounted on the end of the main shaft 5. It will thus be obvious that as the main shaft revolves an oscillating motion will be given to the pawl carrier 86 with the result that the ratchet wheel 84 will be rotated and the pinions 82 and 83, together with the sleeve 75 and associated parts caused to travel along the arc shaped racks 81. It will be observed that, due to the location of the pawl actuating crank disc 99 at the center of curvature, the pawls will be operated in the same way at all points throughout the length of the rack 81 or slot 77. In other words the sleeve 75 and associated parts can travel freely along the slots 77 without in any way interfering with the operation of the pawl driving mechanism.

When the sleeve 75 has reached the lower limit of its travel the pins 96 and 97 will engage the projections 92 and 94 on the pawls 87 and 88, respectively, and trip them out of engagement with the ratchet wheel 84. When this occurs the sleeve 75 and associated parts are automatically returned to the position shown in Figure 1 by means of counter-weights 105 suspended from cords 103 passing over pulleys 104 and secured to the sleeve 75.

The sleeve 75 carries at its forward edge one or more pivoted tongues 75$^a$ preferably formed with a serrated front edge and urged inward toward the form 37 by means of springs 75$^b$. These serrated tongues are for the purpose of engaging or gripping the fabric, as will be readily understood.

Underneath the upper end of the form 37 and spaced therefrom so as to afford sufficient clearance for the sleeve 75 is a curved shield 106 adapted to support the lower edges of the fabric, and in order that the fabric may slip freely over this shield a concave roller 107 is preferably provided, such roller being mounted on a shaft 108 and located in a slot cut in the shield. The fabric then passes between this roller and the form 37.

The object of the machine so far described is to produce a tire fabric such as shown in Figures 21 to 26, and in which the weft threads $a$ run diagonally across the tire, as shown in Figure 22, while the warp threads $b$ extend longitudinally therearound. In order to accomplish this it is obviously necessary that the needle 30 be so moved as to cause the delivery eye to travel in a plane disposed at an acute angle to the axis and substantially parallel with the bevel end 38 of the form 37. In order to cause the delivery eye to travel in such a plane, the needle is reciprocated at the same time that it is oscillated. This reciprocation is effected by means of the lever 21 and crank disc 27, above described, the sleeve 18 sliding back and forth upon the sleeve 13 as the latter oscillates, driven by the alternating radial gearing 7, 8, 9, as described in my former applications.

It is possible to secure the desired results with needles of different shapes. For example, a needle of spiral or cork-screw configuration could be employed. I have, however, shown a needle of annular shape which lies substantially in a single plane, such plane being disposed at an acute angle to the axis of the needle. In one position, as illustrated in Figure 2, the needle lies parallel with the bevel end 38 of the form 37, and then as the needle oscillates and reciprocates it assumes positions at varying angles to the plane of the bevel end 38, several of such positions being indicated by the full and dotted lines in Figure 1, and in Figure 6. It will thus be seen that as the machine operates, the needle lays weft thread from the delivery eye 34 diagonally around the form 37 in a plane parallel with the bevel end 38 of the form, which plane is disposed at an acute angle to the axis of the form and needle, and also at an acute angle to the warp threads which, as shown in Figure 22, and as fully explained in my former patents, extend continuously longitudinally of the form and the fabric. These warp threads are manipulated to form a shed by the heddle mechanism above referred to and shown in detail in my prior patents, and the woven fabric is received around the form 37 under the sleeve 75 and pulled along the form by such sleeve. After the sleeve 75 has travelled to the lower end of the form and made a complete stroke, it is automatically returned to the upper end of the form and catches a new hold on the fabric. Thus as the machine operates the fabric flows from the form in continuous lengths and tends to curl or coil, as shown in Figure 21.

With my improved machine it is possible to arrange the warp threads in any way desired. The fabric A may consist of weft threads with a few warp threads $b$ arranged along the tread and adjacent the edges on either side of the gap or opening C to form beads B. Or the warp threads, as indicated at B' in Figure 26, may be scattered uniformly around the circumference of the fabric. In this case, the weft threads $a$ will be made of comparatively heavy cord, as shown in Figure 25, while the warp threads will be relatively light and thin, this resulting in the production of a diagonal fabric having all of the advantages of that at present employed for forming cord tires. In other words, such a fabric will consist of an annular sheet of diagonally arranged weft threads or cords with successive runs laid close together and held in position by a few fine warp threads placed wherever necessary.

As in my former applications, my improved fabric is a true selvage edge $s$ at one side, and a series of loops $e$ at the other, as shown in Figure 24, and if desired an auxiliary thread $c$ may be interlaced with these loops to form a non-ravelling edge.

It will be understood that the formation of these loops is due to the fact that the needle as it oscillates throws the weft thread around the detents 47, 48, which detents are periodically withdrawn so as to cast off the loop. It is thought that the manner in which these detents operate will be clear from an inspection of Figures 6, 7 and 8 without further discussion.

While the machine so far described is adapted to form a circular fabric of U-shape or C-shape in cross section, open at the inside, as shown in Figure 21, I can, by a slight modification, adapt the machine for weaving a completely closed tubular fabric. While, also, the machine thus far described produces a fabric in which the weft threads run diagonally while the warp threads extend longitudinally, the machine can, by slight modification, be made to produce a fabric in which the warp threads extend helically or spirally around the tubular fabric while the weft threads are laid in diagonal planes as before.

The mechanism for producing a complete tubular fabric of this kind with the warp threads extending helically is shown in Figures 14 to 20, inclusive.

Referring to these figures, it will be seen that in addition to the ratchet wheel 64, the heddle mechanism is provided with an auxiliary ratchet wheel 109, by means of which it may be bodily rotated, this rotation of the heddle frame 62' being permitted by reason of an annular groove 110 in which a set screw 63' operates. The reel carrying frame 56 is also mounted for free rotation upon the bracket 58, and is provided with a ratchet wheel 111, by means of which it may be revolved. The ratchet wheels 109 and 111 are similar in size and number of teeth and are actuated by pawls 112 and 113, respectively, pivotally connected at 114 to bell crank levers 115 mounted on the rod 68 and carrying at their lower ends rollers 116 bearing upon cams 117 secured to the main shaft 5 (see Figures 14 and 20). It will, therefore, be obvious that as the shaft 5 revolves the pawls 112 and 113 are simultaneously actuated to progressively rotate the heddle mechanism and reel carrier in unison.

The same needle as illustrated in Figure 1 is employed in this modified machine, but instead of the detents 47 and 48 shown in Figures 7 and 8, I employ loop interlinking mechanism such as illustrated in detail in my prior Patent No. 1,438,916, above referred to. As in such prior patent, this loop interlinking mechanism comprises a reciprocating yoke 119 which is mounted within the hollow form 37 and is adapted to be reciprocated by means of a pair of cams 118 operated by the sleeve 13. One-way clutch devices, such as shown in my above mentioned application, are employed between the cams 118 and the sleeve 13 so as to produce a proper operation of the yoke 119 as the sleeve oscillates, but I have not thought it necessary to illustrate these devices in detail.

The yoke 119 is provided with an enlarged head 120, under which the cams 118 engage and on which bear leaf springs 121 which urge the yoke downwardly. The whole mechanism is encased by a closure plate 122, having a slot through which extends a horizontal projecting arm 123 forming a continuation of the yoke 119. At the forward end of the arm 123 is pivoted a hook 124 having a pointed and suitably shouldered end 125. Casings 126 are arranged at either side of the extension 123 and within each casing is a pivoted catch 127, urged toward the hook 124 by means of springs 128. Each catch 127 has a cam surface 129 adapted to cooperate with the lower edge of the arm 123, and is provided at its free end with a suitably shaped point 130 adapted to cooperate with the hook 124 in engaging and interlinking the loops of weft thread, all as described in my above mentioned patent.

In order to lock the heddle mechanism and reel carrier against accidental movement and also to prevent the heddle frame being carried around by the frictional drag of the operating ratchet 64, I preferably provide both the reel carrier and heddle frame on one edge with a circular rack 131 (see Figure 18) adapted to be engaged by locking pawls 132. These pawls are pivoted at 133 on brackets 134 supported on the rod 68, and are provided at their lower end with rollers 136 cooperating with recesses formed in cams 137 secured to the main shaft 5. These recesses bear a definite relation to the cams 117 so that the locking pawls 132 are withdrawn from the racks 131 at the moment that the driving pawls 112 and 113 make their operative stroke. At all other times, however, the locking pawls are in engagement and prevent accidental displacement of the reel and heddle frames. It will be understood, of course, that the stroke of the pawl 65 driving the operating ratchet with the heddle mechanism is much greater than that of the pawl 112, so that the ratchet wheel 64 constantly overruns and rotates upon the heddle frame. This is necessary in order that there may be sufficient relative movement between the ratchet 64 and heddle frame to operate the heddles, as described in my former patent.

Figure 28:
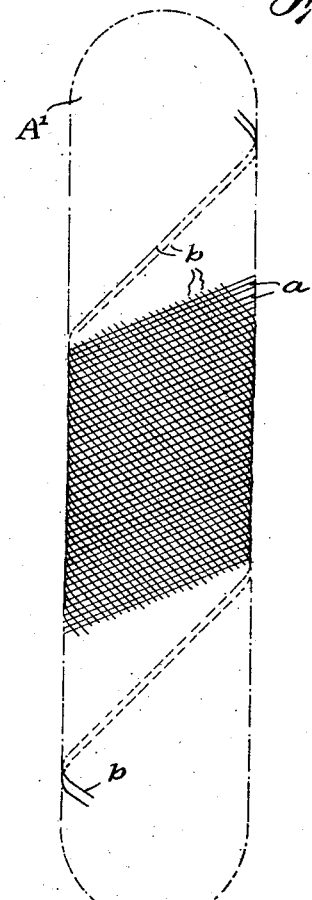
Figure 28 is a diagrammatic view of the same, illustrating the manner in which the warp and weft threads are laid.
Figure 29:
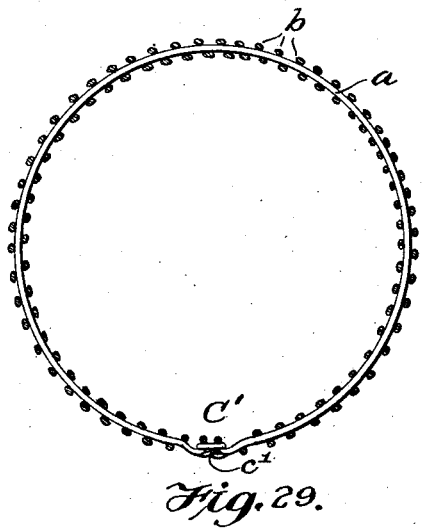
Figure 29 is a conventional transverse section through such tire fabric.
Figure 30:
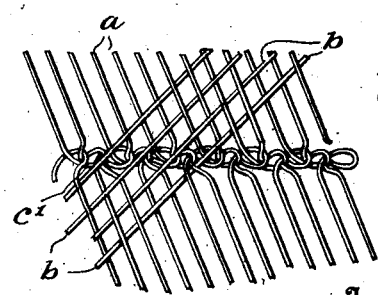
Figure 30 is a fragmentary plan view of the lower part of the tire fabric looking from the inside of Figure 29.

In Figures 27 to 30 I have shown the kind of fabric produced by the machine illustrated in Figures 14 to 20. By reference to Figure 27, it will be seen that this fabric consists of a completely closed tube A', which is produced in indefinite lengths and tends to coil or curl as it comes from the loom. The weft thread $a$ is laid diagonally as in Figure 22, but as shown in Figure 28, the warp threads run spirally or helically around the tubular fabric as indicated at $b$. Figure 30 illustrates diagrammatically how the loops $c'$ of weft thread are interlinked to form a joint or seam C' (see Figure 29), and also illustrates the manner in which the warp threads $b$ run diagonally across the weft thread and extend continuously past the seam or joint C' without interfering therewith. A fabric such as illustrated in Figures 27 to 30 is especially useful in forming inner tubes for pneumatic tires, as it is very desirable that such inner tubes be reinforced by textile material. It will be understood that the helical plane of the warp threads is due to the rotation of the heddle mechanism. This rotating heddle not only forms the shed through which the oscillating needle lays the weft thread, but, by its rotation, progressively carries the warp threads around, thus causing them to be laid helically as shown in Figure 28.

While I have illustrated this form of machine as laying the weft thread in diagonal planes, it is obvious that, if desired, the needle may be given only a simple oscillatory movement as in my former patents, and in this even the weft thread would be laid at right angles to the axis of the tube in true radial planes, while the warp threads would be laid helically.

It will thus be seen that I have provided a machine which, with slight modifications, can be designed to produce a tubular fabric of almost any desired weave. That is to say, either a U-shaped fabric or a complete tubular fabric may be produced at will, and either the warp threads or the weft threads, or both, may be caused to run diagonally as desired. Also by varying the character of the weft thread and the location and disposition of the warp thread, circular fabrics of various textures, weights, and flexibility can be produced so as to meet any requirements of tire manufacturers.

What I claim is:

1. The combination with a transversely curved arcuate form, of means for supporting longitudinally extending warp threads of indefinite length therearound, and means for laying weft threads diagonally across the warp thus supported.

2. The combination with a transversely curved form, of means for laying warp and weft threads diagonally substantially completely around said form and interweaving them to produce a tubular fabric of indefinite length, said sets of threads crossing each other at an angle, and means for removing said fabric continuously from said form as it is produced.

3. Means for producing a woven tubular fabric of indefinite length comprising a curved form, means for supporting longitudinally extending warp threads therearound, means for laying weft threads diagonally across and interweaving them with the warp threads, to produce a tubular fabric, and means for continuously removing the fabric from the form, as it is woven.

4. Means for producing a tubular fabric of indefinite length comprising a curved form, means for supporting longitudinally extending warp threads therearound, means for laying weft threads across the warp in planes disposed at an acute angle to the axis of the form to produce a tubular fabric, and means for continuously removing the fabric from the form, as it is produced.

5. In a loom, the combination with a curved form, and means for supporting warp threads therearound, of an annular needle disposed adjacent said form in a plane at an acute angle to the warp, and means for moving said needle so as to cause it to lay weft threads around such form diagonally across the warp.

6. In a loom, the combination with means for supporting warp threads so as to conform to the arc of a circle, of a rigid annular needle lying in a plane disposed at an acute angle to such circular warp, and means for moving said needle so as to cause it to lay weft threads, diagonally across the warp.

7. In a loom, the combination with means for supporting warp threads and for forming a substantially cylindrical shed, of a curved oscillatory needle lying in a plane disposed at an acute angle to the axis of said shed, and means for oscillating said needle so as to cause it to enter such cylindrical shed and lay weft threads diagonally therein.

8. In a loom, the combination with means for supporting warp threads so as to define a curved surface, of means for forming a shed, an annular oscillatory needle lying in a plane disposed at an acute angle to the warp threads, and having a gap through which such threads pass, and means for oscillating said needle so as to cause it to lay weft threads diagonally in such shed.

9. In a loom, the combination with means for supporting warp threads so as to form a curved surface, of means for producing a shed in such warp, and an annular needle lying in a plane at an acute angle with said warp threads adapted to enter said shed and lay weft thread diagonally therein, said needle having a gap through which the warp threads pass, and a point having a weft thread delivery eye adjacent said gap.

10. In a loom, the combination with means for supporting warp threads so as to form a curved surface, of means for producing a shed in such warp, and an annular needle adapted to enter said shed and lay weft thread therein, said needle having a gap, and a point adjacent said gap provided with a thread delivery eye, and a guide tube extending circumferentially around said needle, through which tube the weft thread passes on its way to said eye.

11. In a loom, the combination with means for supporting warp threads so as to form a curved surface, a circular heddle for producing a shed in such warp, an annular oscillatory needle adapted to lay weft thread diagonally in such shed, said needle and heddle being disposed on a common axis, and means for oscillating said needle.

12. In a loom, the combination with means for supporting warp threads so as to form a curved surface, a circular heddle for producing a shed in such warp, an annular, oscillatory needle adapted to lay weft thread diagonally in such shed, said needle and heddle being mounted on a common axis, means for oscillating said needle and means for rotating said heddle about such axis.

13. The combination with a circular form, of means for laying warp threads therearound in continuous helices and means for laying weft thread diagonally across said continuous helical warp threads in planes disposed at an acute angle to the axis of said form.

14. The combination with a curved form, and means for supporting warp threads around the same, of means for passing weft thread back and forth across said warp threads so as to form a loop at each reversal thereof, means for successively linking said loops together to produce a tubular fabric, and means for causing said warp threads to extend helically around the fabric thus formed.

15. The combination with a curved form, and means for supporting warp threads around the same, and forming a shed therein, of means for passing weft thread back and forth through the shed and across said warp threads so as to form a loop at each reversal thereof, means for interlinking said loops to form a tubular fabric, and means for progressively rotating said shed forming means so as to lay the warp threads helically about said form.

16. The hereindescribed method of producing a woven tubular fabric which consists in laying warp threads in continuous helices around a curved form, passing a weft thread back and forth across the warp around said form, doubling the weft thread upon itself at each reversal so as to form loops, and linking such loops together as they are formed.

17. The hereindescribed method of producing a woven tubular fabric which consists in laying warp threads in continuous helices around a curved form, passing a weft thread back and forth across the warp around said form in a plane at an acute angle to the axis thereof, doubling the weft thread upon itself at each reversal so as to form loops, and linking such loops together as they are formed, whereby both warp and weft threads extend diagonally of the tubular fabric.

18. The hereindescribed method of producing a woven circular fabric of indefinite length, which consists in laying warp threads longitudinally around a circular form, passing a weft thread back and forth across the warp around said form in a plane at an acute angle to the axis thereof to produce a fabric, and removing such fabric continuously from the form as it is woven.

19. The hereindescribed method of producing a longitudinally coiled woven circular fabric, which consists in arranging continuous warp threads around an arc-shaped circular form, and laying a weft thread back and forth across the warp around said form in a plane disposed at an acute angle to the transverse axis of said form, and passing through the center of curvature thereof.

20. In a loom, the combination with a circular form, an annular needle, and a circular heddle all arranged about a common axis, said needle being disposed in a plane at an acute angle to such axis and located between the form and heddle.

21. In a loom, the combination with a circular form and circular heddle, of an annular needle located between them, and all mounted on a common axis, means for oscillating said needle, and means for rotating said heddle about such axis.

22. In a loom, the combination with a circular form, annular needle, circular heddle, and warp thread reel holder arranged in the order named and all disposed about a common axis.

23. In a loom, the combination with a circular form, annular needle, circular heddle, and warp thread reel holder arranged in the order named and all disposed about a common axis and means for rotating said heddle and reel holder.

24. In a loom, the combination with a curved form, and means for supporting warp threads therearound, of a curved needle adapted to lay weft thread diagonally across the warp around said form, and means for oscillating said needle and simultaneously reciprocating it toward and from said form.

25. In a loom, the combination with a curved form, and means for supporting warp threads therearound, of a curved needle adapted to lay weft thread diagonally across the warp around said form, said needle being mounted in a plane at an acute angle to its axis, and means for oscillating said needle about such axis and simultaneously reciprocating it toward and from said form.

26. In a loom, the combination with a curved form having a beveled end, and means for supporting warp threads therearound, an annular needle mounted adjacent said beveled end and having a thread delivery eye adapted to lay weft thread around said form across the warp threads, and means for simultaneously oscillating and reciprocating said needle so as to cause said thread delivery eye to always move in a plane substantially parallel with that of the beveled end of the form.

27. In a loom, the combination with a curved form having a beveled end, and means for supporting warp threads therearound, an annular needle mounted adjacent said beveled end and having a thread delivery eye adapted to lay weft thread around said form across the warp threads, said needle being disposed in a plane at an acute angle to its axis, and means for simultaneously oscillating and reciprocating said needle so as to cause said thread delivery eye to always move in a plane substantially parallel with that of the beveled end of the form.

28. In a loom, the combination with a circular form, and means for supporting warp threads therearound, of an annular needle mounted in the axis of said form and having a thread delivery eye adapted to lay weft thread around said form across the warp, and means for simultaneously oscillating and reciprocating said needle so as to cause said thread delivery eye to move always substantially in a plane disposed at an acute angle to the common axis of said form and needle.

29. In a loom for weaving tubular fabrics, the combination with means for supporting warp threads to form a curved surface, of means for producing a shed, a pair of bodily reciprocable detents disposed one adjacent each edge of such warp, a curved oscillatory needle for laying weft thread back and forth through the shed, and looping it around such detents, and means for reciprocating said detents to withdraw them from the loops thus formed.

30. In a loom for weaving tubular fabrics, the combination with a curved hollow form, means for supporting warp threads therearound, and means for forming a shed, of a pair of movable detents mounted within said hollow form and projecting slightly beyond the external surface thereof, the projecting ends of said detents being disposed one adjacent each edge of the warp, a curved, oscillatory needle for laying weft thread back and forth around said form through the shed, and looping it about such detents, and means for moving said detents to withdraw them from the the loops thus formed.

31. In a loom for weaving tubular fabrics, the combination with a curved hollow form, means for supporting warp threads therearound, and means for forming a shed, of a pair of movable detents mounted within said hollow form and projecting slightly beyond the external surface thereof, the projecting ends of said detents being disposed one adjacent each edge of the warp, a curved, oscillatory needle for laying weft thread back and forth around said form through the shed, and looping it about such detents, a shaft on which said needle is mounted, and means operated by said needle shaft for moving said detents to withdraw them from the loops thus formed.

32. The combination with a suitable fixed form, of means for continuously laying a single thread diagonally around the same and for maintaining the successive runs thereof close together in substantial contact throughout their length to produce a bias tubular fabric of indefinite length, and means for continuously feeding such fabric along and off of said form as the successive runs of thread are added.

In testimony whereof I affix my signature.
EMANUEL INGHAM.